United States Patent [19]
Anderson

[11] 3,958,720
[45] May 25, 1976

[54] ADJUSTABLE MULTIPLE CONTAINER DISPENSING APPARATUS
[76] Inventor: Ralph F. Anderson, 332 Calvin Park Blvd., Rockford, Ill. 61107
[22] Filed: May 19, 1975
[21] Appl. No.: 578,903

[52] U.S. Cl.................................. 221/93; 221/131; 221/223; 221/241
[51] Int. Cl.².......................................... B65H 3/44
[58] Field of Search...... 221/93, 123, 131, 221–223, 221/297, 298, 241, 242; 214/8.5 R, 8.5 K

[56] References Cited
UNITED STATES PATENTS

| | | | |
|---|---|---|---|
| 2,445,958 | 7/1948 | Lindstrom............................ | 221/223 |
| 2,618,394 | 11/1952 | Miller ................................... | 221/131 |
| 3,074,594 | 1/1963 | Cheeley .............................. | 221/223 |
| 3,795,344 | 3/1974 | Falk et al............................. | 221/241 |

Primary Examiner—Robert B. Reeves
Assistant Examiner—H. Grant Skaggs
Attorney, Agent, or Firm—Morsbach & Pillote

[57] ABSTRACT

An adjustable multiple container dispensing apparatus in which first and second sets of container dispensing cams are arranged in first and second rows to define a plurality of container dispensing throats with four cams arranged to engage and dispense containers in each dispensing throat and with the cams of the first and second sets adjustable toward and away from each other to vary the size of the dispensing throat for dispensing different size containers. First and second sets of stack guide members are mounted for adjustment with the first and second sets of container dispensing cams to adjust the size of the container magazines simultaneous with adjustment of the size of the container dispensing throats.

9 Claims, 9 Drawing Figures

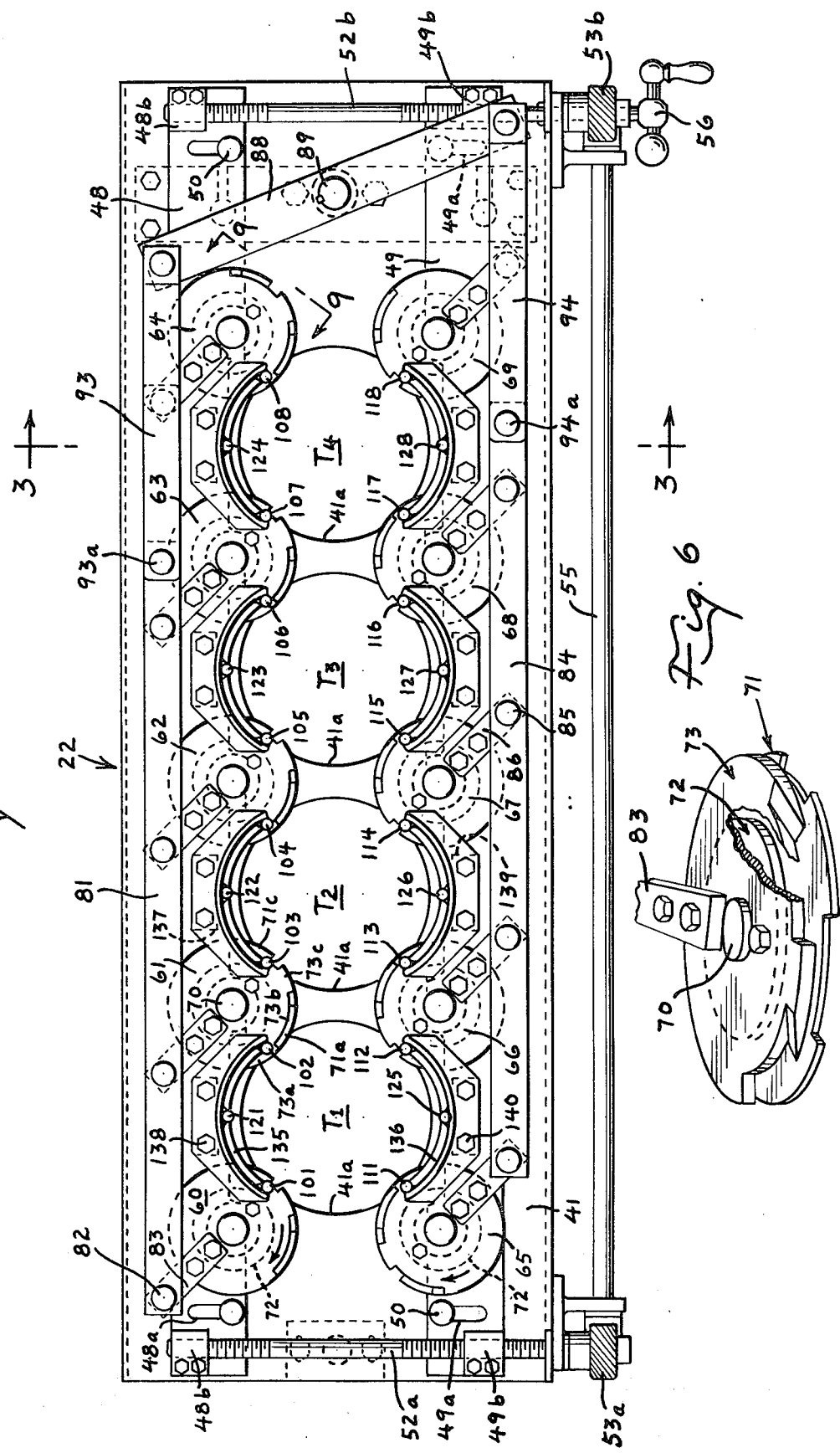

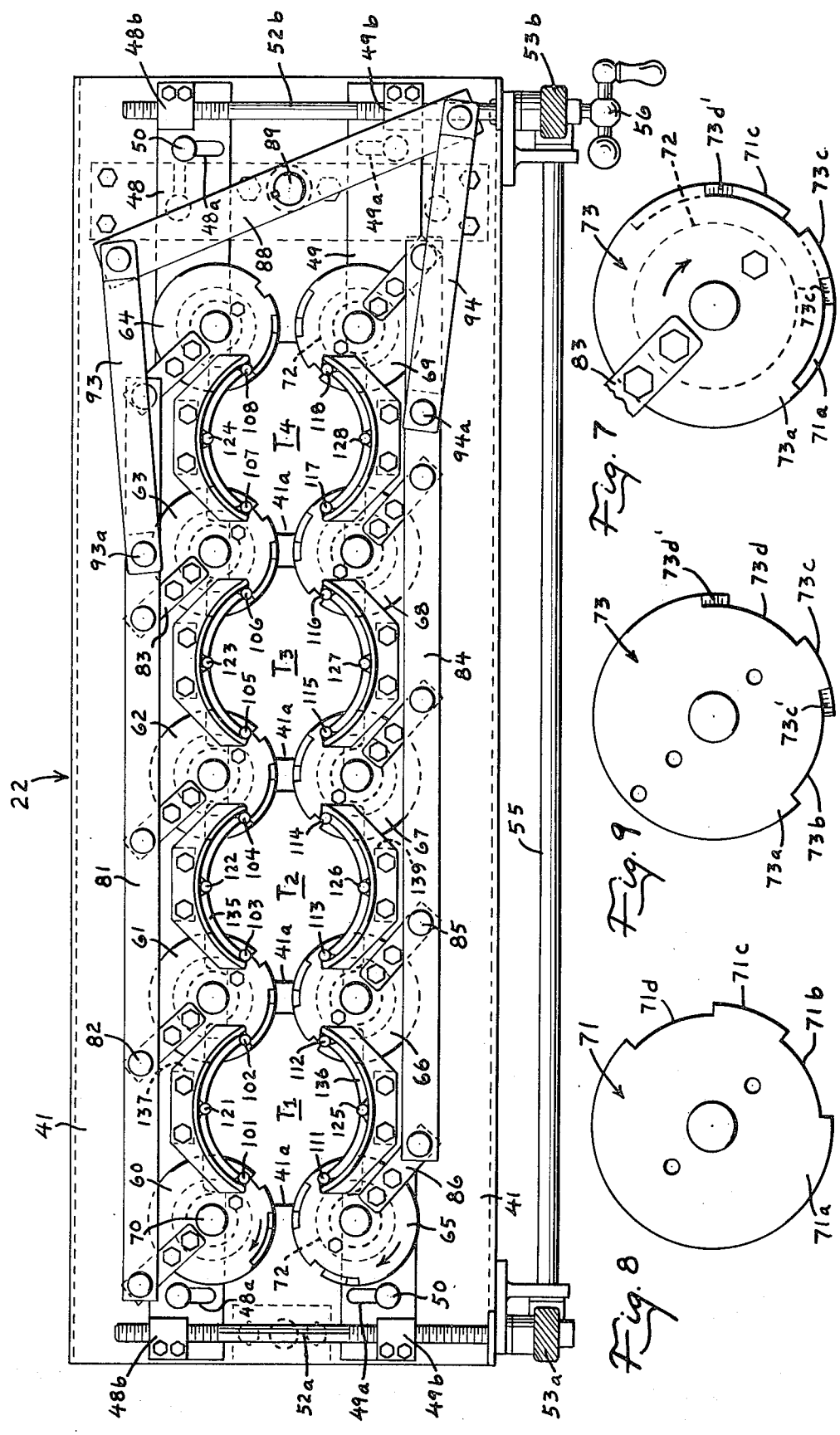

ADJUSTABLE MULTIPLE CONTAINER DISPENSING APPARATUS

BACKGROUND OF INVENTION

In multiple lane filling machines, it is frequently desirable to simultaneously dispense a plurality of containers, one for each lane, in timed relation with the operation of the filling machine. The diameter of the containers, however, varies widely with different styles of containers and with containers of different capacity, and it is desirable to provide a dispenser which is adjustable to dispense containers of different size. However, the multiple lane filling machine frequently have adjacent lanes closely spaced together in order to minimize the overall size of the filling machine and the multiple container dispenser must therefore be adapted to simultaneously dispense a plurality of containers in closely spaced side-by-side relation.

It has heretofore been proposed as shown in the patent to Miller, U.S. Pat. No. 2,618,394, issued Nov. 18, 1952, to make an adjustable multiple container dispenser using separate replaceable container magazines for each different size of container and with two container dispensing segments for each magazine arranged to engage the container in their respective magazine at two diammetrically opposite locations and with the segments adjustable toward and away from each other to adapt the dispenser for use with different size containers. The circular containers, however, can tilt and cock relative to the stack and it is difficult to reliably dispense circular containers, particularly those of relatively large diameter, when contacting the containers at only two locations. Moreover, the multiple container dispenser in the aforementioned patent required separate container magazines for each different size of container and removal and replacement of the container magazines to change from one size to the other. This increased the overall cost of the container dispenser and the time required for change over between different size containers.

SUMMARY OF THE INVENTION

The present invention relates to an adjustable multiple container dispensing apparatus.

It is the general object of the present invention to provide an adjustable multiple container dispensing apparatus which is adjustable to accommodate a wide rage of container sizes and which achieves reliable dispensing of the containers with four container dispensing cams engaging the lowermost container in each stack at four angularly spaced locations.

Another object of this invention is to provide an adjustable multiple container dispensing apparatus in accordance with the foregoing object in which the container dispensing cams are constructed and arranged to minimize the spacing between sidewise adjacent containers and the number of container dispensing cams required for dispensing the multiple containers.

Another object of this invention is to provide an adjustable multiple container dispensing apparatus in which the magazines for storing the stacked containers during dispensing are constructed and arranged so that the stack magazines are automatically adjusted during adjustment of the container dispensing cams for different size containers.

Still another object of this invention is to provide an adjustable multiple dispensing apparatus having an improved mechanism for simultaneously actuating all the container dispensing cams in the different adjusted positions of the container dispenser.

These, together with other objects and advantages of this invention will be more readily understood by reference to the following detailed description, taken in connection with the accompanying drawings wherein:

FIGS. 4 and 5 are top plan views of the adjustable multiple container dispensing apparatus taken on the plane 4—4 of FIG. 2 and illustrating the dispenser in different adjusted positions;

FIG. 6 is a perspective view of one of the container dispensing cam members, with parts broken away and shown in section to illustrate details of construction;

FIG. 7 is a top plan view of one of the container dispensing cams;

FIG. 8 is a plan view of the lower cam plate of the dispensing cam of FIG. 7 and;

FIG. 9 is a plan view of the upper cam plate of the dispensing cam of FIG. 7.

Figure 1:
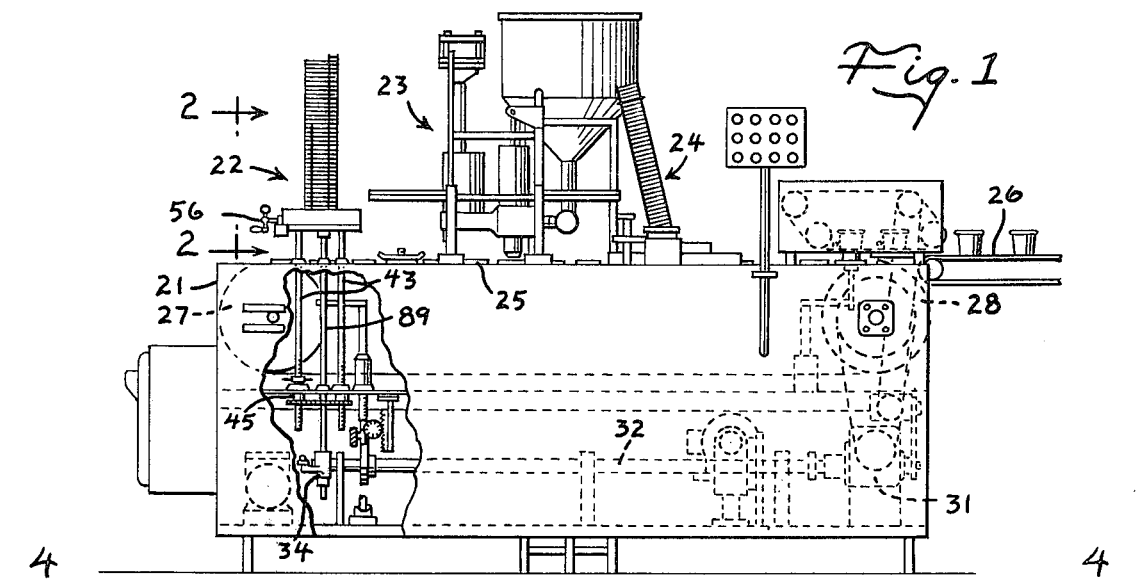
FIG. 1 is a side elevational view of a filling machine embodying the adjustable multiple container dispensing apparatus of the present invention.
Figure 2:
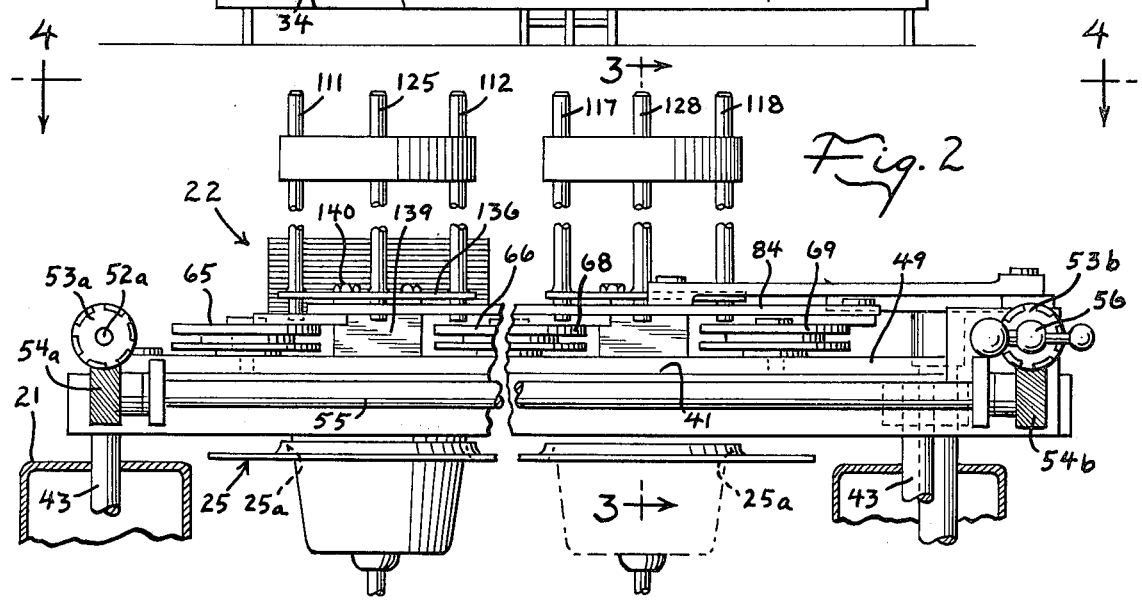
FIG. 2 is a fragmentary transverse sectional view taken on the plane 2—2 of FIG. 1 and illustrating parts of the container dispensing apparatus on a larger scale than FIG. 1.
Figure 3:
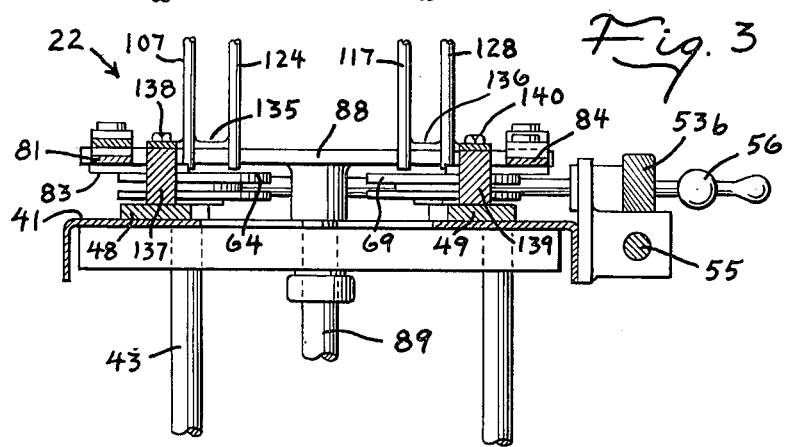
FIG. 3 is a fragmentary longitudinal sectional view taken on the plane 3—3 of FIG. 2.

The adjustable multiple container dispensing apparatus of the present invention is generally adapted for use with multiple filling machines as shown in FIG. 1 to simultaneously dispense a plurality of cups in close side-by-side relation in timed relation with the operation of the filling machine. The filling machine in general includes a support frame 21 having a cup dispenser 22 adjacent one end, a filling apparatus 23, a capping apparatus 24, and a container transfer mechanism for transferring the containers from the dispenser 22 past the filler 23 and capper 24 to an outward conveyor 26. In the embodiment illustrated, the container transfer mechanism is in the form of a pocketed conveyor 25 entrained over sprocket wheels 27 and 28 adjacent opposite ends of the frame. In order to minimize the overall size of the filling machine, the pockets 25a in the pocketed conveyor are spaced relatively close to each other and the container dispenser 22 is arranged to simultaneously dispense the plurality of containers in closely spaced side-by-side relation into the pockets 25a in timed relation with the advance of the conveyor. Any suitable arrangement may be utilized for operating the conveyor and container dispenser in timed relation and, as shown in FIG. 1, the conveyor 25 is driven from a power take off 31 on a main drive shaft 32 and the container dispenser 22 is also driven from the main drive shaft 32 by a crank mechanism 34.

The container dispenser 22 includes an elongated support in the form of a plate 41 that extends crosswise of the conveyor 25 and which has openings 41a therein aligned transversely of the machine with the pockets 25a of a size sufficiently large to pass the largest sized containers to be dispensed. The support plate 41 is mounted at its opposite ends on posts 43 that extend downwardly through the frame 21 of the filling machine at opposite sides of the conveyor and which can be vertically adjusted relative to the conveyor to change the spacing between the container dispenser and the conveyor for containers of different height. As shown in FIG. 1, the lower ends of the rods 43 are threaded and are engaged by sprockets 45 and a chain preferably extends around the sprockets on all four of the rods 43 to enable simultaneously adjustment of all of the rods.

First and second horizontal frame members 48 and 49 are mounted on the support 41 for relative adjustment laterally toward and away from each other and, as shown in FIGS. 4 and 5, the frame members 48 and 49 have slots 48a, 49a respectively adjacent their ends which are retained on the support plate by headed guide pins 50. The frame members are positively adjusted toward and away from each other by screws 52a and 52b having oppositely threaded end portions threadedly engaged in followers 48b and 49b on the frame members 48 and 49. The screws 52a and 52b are advantageously arranged to be turned in unison to maintain the frame members in relatively parallel relation and, as shown, have gears 53a and 53b on their ends that mesh with gears 54a and 54b on the cross shaft 55. A crank 56 is connected to one of the shafts 52b to enable manual turning of the same for adjustment of the container dispenser.

The container dispenser can be arranged to simultaneously dispense any desired number of containers and is herein shown arranged to simultaneously dispense four containers in close side-by-side relation. A first set of N+1 rotary cam members where N is the number of containers to be dispensed designated 60–64 are mounted on the first frame member 48 and a second set of N+1 rotary cam members designated 65–69 are mounted on the second frame member for rotation of an upright axes. In the embodiment shown, the cam members are rotatably mounted by cap screws 70 on their respective frame members and the axes on the first set of cam members 60–64 are arranged in a first row at a preselected uniform spacing therealong and the axes of the second set of rotary cam members 65–69 are arranged in a second row paralleling the first row and at the same preselected uniform spacing and with each cam member of the first set aligned in a direction perpendicular to the rows with the respective one of the cam members of the second set. Thus, rotary cam members 60, 65; 61, 66; 62, 67; 63, 68; and 64, 69 form transverse pairs and the spacing between the axes of adjacent transverse pairs is made to correspond with the center-to-center spacing of adjacent lanes in the multiple lane filling machine. The axes of the transverse pairs of cam members, however, are located so as to extend along opposite sides of each lane and define a container dispensing throat intermediate adjacent ones of the transverse pairs of cam members. Thus, a throat T1 is defined intermediate the pairs of cam members 60, 65 and 61, 66; a throat T2 is defined intermediate the pairs of cam members 61, 66 and 62, 67; a throat T3 defined intermediate the pairs of cam members 62, 67 and 63, 68 and a throat T4 defined intermediate the pairs of cam members 63, 68 and 64, 69. The cam members 61, 62, 63, and 66, 67, 68 that are intermediate the ends of each set are arranged to control dispensing of containers from two adjacent throats. With this arrangement, the cam members engage the containers at four angularly spaced locations to effect accurate control of the containers during dispensing. However, the number of transverse pairs of cam members need only be one more than the number of containers to be dispensed at each cycle. This not only minimizes the number of cam members required and simplifies manufacture and assembly, but also allows dispensing of the containers in closely spaced side-by-side relation.

The intermediate cam members accordingly have dual container support and separating means at angularly spaced locations to extend inwardly of the two adjacent container dispensing throats. The cam members at the ends of each set need only have one container support and separating means at an angular location to extend inwardly of the adjacent container dispensing throat. However, to simplify manufacture and assembly, the cam members at the ends of the ends of the sets are conveniently made the same as the intermediate cam members, it being understood that one of the container support and separating means on the end cam members are not used.

The rotary cam members are conveniently formed in sections to facilitate manufacture and include a lower plate 71, an intermediate spacer 72 and an upper plate 73. The rotary cam members are normally positioned as shown in FIGS. 4–9 to support the lowermost container in the respective stack and are movable in the direction indicated by the arrows from the first position to a second angular position approximately 90° from the first position and back to the first position. The upper plate 73 has first and second article support sectors 73a and 73c having their outer periphery spaced a preselected radial distance from the axis of the cam members and first and second article release sectors 73b and 73d at the trailing side of the sectors 73a and 73c respectively and which have their outer peripheries spaced radially inwardly of the sectors 73a and 73c. The upper plate 73 is spaced above the lower plate 71 by the spacer 72 a distance slightly greater than the vertical thickness of the rim on the container to allow the container rim that drops through the release sectors 73b and 73d to pass under the upper plate 73. The lower plate 71 has first and second support sectors 71a and 71c spaced preferably the same preselected radial distance from the axis of the cam member and intermediate release sectors 71b and 71d having their peripheries spaced inwardly from the sectors 71a and 71c. As best shown in FIGS. 6 and 7, the upper end lower plates 73 and 71 are angularly positioned so that the release sectors 73b and 73d in the upper plate overlie the support sectors 71a and 71c of the lower plate. Circumferential cam surfaces 73c' and 73d' are provided on the upper plate 73 at the trailing side of the release sectors 73b and 73d to cam the rim on the next to the last container upwardly onto the top of the upper cam member, when the cam members are rotated to their second position. Thus, the support sector 73a, release sector 73b, support sector 71a and release sector 71b cooperate to form a first container support and separating means on the cam member, and the support sector 73c, release sector 73d, support sector 71c and release sector 71d cooperate to form a second container support and separating means on the cam member. The container support and separating means on the cam members are operative, when the cam members are in their first position, to underlie and support the rim on the lowermost container in the stack and, when moved to their second position, to separate the lowermost container from the remainder of the stack and support the next succeeding container. As the cam members move from the second position back to the first position, the containers that are then at the lower end of the stack can drop onto the support sectors 71a, 71c of the lower plate 71 to be dispensed during the subsequent dispensing cycle.

The cam members of the first and second sets are operated in unison from the first position to the second position and back and are preferably rotated in the same direction. The operating means includes a first actuator bar 81 generally paralleling the first frame member 48 and pivotally connected by pivot pins 82 to arms 83 rigid with each of the cam members 60–64 of the first set, at locations eccentric to the axis of the cam members so that the cam members are turned about their axes in response to lengthwise movement of the actuator bar 81. A second actuator bar 84 extends generally lengthwise of the second frame member 49 and is pivotally connected by pins 85 to arms 86 rigid with the cam members of the second set at a location eccentric to the axis of the cam members to rotate the cam members of the second set about their axes in response to lengthwise movement of the second bar 84. The cam members are shown in FIGS. 4 and 5 in their first angular position and the arms 83 and 86 on the first and second sets of cam members are arranged to extend at an angle about 45° with respect to a plane perpendicular to the actuator bars, but in relatively opposite directions so that the cam members of the first and second sets turn in the same direction in response to movement of the bars 81 and 84 in relatively opposite directions. A lever 88 is mounted intermediate its ends on an upright shaft 89 for turning movement therewith and opposite ends of the lever are pivotally connected to one end of links 93 and 94, the other ends of which are respectively pivotally connected at 93a and 94a to the actuator bars 81 and 84 respectively. The links 93 and 94 extend generally parallel to the respective actuator bars and are connected to the actuator bars intermediate the ends of the latter so that lateral adjustment of the dispensing mechanism does not significantly affect the positions of the cam members. As best shown in FIG. 1, the shaft 89 extends downwardly through the frame 21 of the dispensing machine and is connected through the crank mechanism 34 to be oscillated about its axis in timed relation with the operation of the conveyor.

Stack magazines are provided for supporting the stacks of containers in alignment with the throats T1 – T4. In accordance with the present invention, the stack magazines are also made laterally adjustable with the cam members to also adjust the size of the stack magazines. In general, the stack magazines include a first set of stack guides mounted on the first frame member 48 and a second set of stack guides mounted on the second frame member 49 so that the first and second sets of stack guides are laterally adjusted toward and away from each other during adjustment of the frame members. The first set of stack guides includes a number of generally upright main stack guide members designated 101–108, each individual to one of the container support and separating means on the first set of cam members and each fixedly mounted on the first frame member 48 at a location to extend upwardly from the respective container support and separating means to locate the container stack in proper relation thereto. The second set of stack guides also includes a number of generally upright main stack guide members designated 111–118, each individual to one of the container support and separating means on the second set of cam members and each fixedly mounted on the second frame member 49 at a location to extend upwardly from the respective container support and separating means to locate the stack of containers relative thereto. As will be seen, two main stack guide members of the first set and two main stack guide members of the second set cooperate to define a container magazine therebetween. The size of the container magazine corresponds generally to the size of the circle that can be inscribed in the four main stack guide members that define each magazine and, as will be seen from FIGS. 4 and 5, the size of the container magazine changes as the frame members 48 and 49 are moved toward and away from each other. As the frame members are adjusted to the minimum size container magazine as shown in FIG. 5, the main stack guide members of the first and second sets contact the stack at locations relatively close to each other and, in order to achieve more accurate guiding of the stack under these conditions, the first and second sets of stack guide members also include auxiliary stack guide members 121–124 and 125–128 respectively located intermediate the two main stack guide members of each magazine at a location offset outwardly therefrom so as to lie in the locus of the circle inscribed in the main stack guide members of each set, when the latter are in their minimum position as shown in FIG. 5. In other words, when the frame members are adjusted to the minimum size containers to be handled, the main and auxiliary stack guide members in each magazine lie in a common circular locus generally corresponding to the cross section of the minimum size container to be dispensed.

The main and auxiliary stack guide members of the first set are conveniently arranged in groups each individual to a respective one of the magazines and mounted on generally arcuate brackets 135 that are supported by spacer blocks 137 and fasteners 138 on the main frame member 48 for movement therewith and, similarly, the main and auxiliary stack guide members of the second set are conveniently arranged in groups secured to arcuate brackets 136 and mounted by spacer blocks 139 and fasteners 140 on the second frame member 49 for adjustment therewith.

From the foregoing it is thought that the construction and operation of the adjustable multiple container dispensing apparatus will be readily understood. The first and second sets of cam members are arranged to define a plurality of container dispensing throats with four container support and separating means for each container magazine, and the first and second sets of cam members are adjustable toward and away from each other to adjust the size of the container dispensing throats for containers of different diameter. Further, the stack magazines include first and second sets of main stack guide members which are adjustable with the respective first and second sets of cam members and which locate the stack in proper relation to the respective container support and separating means in all adjusted positions of the cam members. In addition, the height of the container dispensing apparatus relative to the conveyor can be selectively adjusted through rods 43 and screw sprockets 45 to accommodate containers of different heights.

While the present invention has been described in connection with a particular embodiment thereof, it will be understood that those skilled in the art may make many changes and modifications without departing from the true spirit and scope of this invention as defined in the appended claims.

The embodiments of the invention in which an exclusive property or privilege is claimed are defined as follows:

1. An adjustable multiple container dispensing apparatus for simultaneously dispensing a number N of circular containers having a marginal rim from N stacks of nested containers where N is a number no less than 2 comprising: a support and first and second horizontal frame members mounted on said support for relative adjustment laterally toward and away from each other, a first set of N+1 rotary cam members and a second set of N+1 rotary cam members respectively mounted on the first and second frame members for rotation about upright axes, the axes of the first set of rotary cam members being located in a first row at a preselected uniform spacing along the first frame member and the axes of the second set of cam members being located in a second row paralleling the first row at said preselected uniform spacing along the second frame member, each cam member of the first set being aligned in a direction perpendicular to said rows with a respective one of the cam members of the second set to define N+1, transverse pairs of cam members and N container dispensing throats each intermediate adjacent ones of said transverse pairs of cam members, means for simultaneously turning each of the cam members of both said first and second sets between a first angular position and a second angular position, the cam members at the ends of each set each having at least one container support and separating means at an angular location to extend inwardly of the container dispensing throat adjacent thereto and the cam members intermediate the end of each set each having two container support and separating means at angularly spaced locations to extend inwardly of a respective one of the two adjacent container dispensing throats, the container support and separating means being operative to support the lowermost container in a stack when in their first angular position and to separate and discharge the lowermost container and support the next adjacent container in the stack when moved to their second position, and stack guide means defining N container magazines each individual to a respective one of the container dispensing throats, and means for laterally adjusting said first and second frame members to adjust the size of the container dispensing throats defined by the first and second sets of cam members.

2. An apparatus for dispensing containers according to claim 1 wherein stack guide means includes first and second sets of stack guides respectively mounted on said first and second frame members for lateral adjustment therewith whereby the size of the container magazines is adjusted when the spacing of the frame members is adjusted.

3. An apparatus for dispensing containers according to claim 2 wherein said first set of stack guides includes a number 2N of generally upright main stack guide members each individual to one of the container support and separating means on the first set of cam members and each fixedly mounted on the first frame member at a location to extend upwardly from the respective container support and separating means, said second set of stack guides including a number 2N of generally upright main stack guide members each individual to one of the container support and separating means on the second set of cam members and each fixedly mounted on the second frame member at a location to extend upwardly from the respective container support and separating means.

4. An apparatus for dispensing aritcles according to claim 3 wherein said first set of stack guides includes at least one auxiliary stack guide for each container magazine mounted on the first frame member at a location intermediate adjacent ones of the cam members of the first set, and said second set of stack guides includes at least one auxiliary stack guide for each container magazine mounted on the second frame member at a location intermediate adjacent ones of the cam members of the second set.

5. An apparatus for dispensing containers according to claim 1 wherein all of the cam members of both the first and second sets are turned in the same direction during movement from said first angular position to said second angular position.

6. An apparatus for dispensing containers according to claim 1 wherein said means for simultaneously turning said cam members include a first actuator bar paralleling said first row and having a pivotal connection to each of the cam members of the first set at a location eccentric to the axes of the cam members and a second actuator bar paralleling said second row and having a pivotal connection to each of the cam members of the second set at a location eccentric to the axes of the cam members, a lever mounted intermediate its ends in an upright axis intermediate the first and second actuator bars, and links connecting opposite end portions of the lever to said first and second actuator bars.

7. An apparatus for dispensing containers according to claim 1 wherein said article support and separating means each include upper and lower article support sectors vertically spaced apart and with the lower sector angularly offset from the upper sector in a direction opposite the direction of rotation of the cam members from their first to their second positions.

8. An apparatus according to claim 1 wherein said means for adjusting said frame members includes first and second screws each having oppositely threaded end portions engaging followers on said first and second frame members.

9. An apparatus according to claim 8 including means interconnecting the first and second screws to rotate the same in unison.

* * * * *